US012682803B2

(12) United States Patent
Tsai et al.

(10) Patent No.: US 12,682,803 B2
(45) **Date of Patent: \*Jul. 14, 2026**

(54) ELECTRONIC DEVICE

(71) Applicant: Innolux Corporation, Miaoli County (TW)

(72) Inventors: Chia-Hao Tsai, Miaoli County (TW); Ming-Jou Tai, Miaoli County (TW); Youcheng Lu, Miaoli County (TW); Yu-Shih Tsou, Miaoli County (TW); Yung-Hsun Wu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,308

(22) Filed: Feb. 26, 2025

(65) Prior Publication Data

US 2025/0201161 A1 Jun. 19, 2025

Related U.S. Application Data

(63) Continuation of application No. 18/329,602, filed on Jun. 6, 2023, now Pat. No. 12,266,283, which is a (Continued)

(30) Foreign Application Priority Data

Jun. 19, 2020 (CN) .......................... 202010567490.9

(51) Int. Cl.
*G09G 3/20* (2006.01)
*G06F 1/16* (2006.01)

(52) U.S. Cl.
CPC .............. *G09G 3/20* (2013.01); *G06F 1/1686* (2013.01); *G09G 2310/0251* (2013.01); *G09G 2310/08* (2013.01); *G09G 2320/0666* (2013.01)

(58) Field of Classification Search
None
See application file for complete search history.

(56) References Cited

U.S. PATENT DOCUMENTS

| | | | |
|---|---|---|---|
| 12,266,283 B2* | 4/2025 | Tsai ........................ | G09G 3/20 |
| 2022/0100022 A1* | 3/2022 | Wang ................. | G02F 1/13685 |

FOREIGN PATENT DOCUMENTS

| | | |
|---|---|---|
| CN | 110767707 | 2/2020 |
| CN | 111192546 | 5/2020 |

OTHER PUBLICATIONS

"Office Action of China Counterpart Application", issued on May 11, 2026, p. 1-p. 8.

* cited by examiner

*Primary Examiner* — Ifedayo B Iluyomade
(74) *Attorney, Agent, or Firm* — JCIPRNET

(57) ABSTRACT

An electronic device having a general region and a functional region is provided. The general region includes a first sub-region, and the functional region includes a second sub-region. A first part of the black matrix layer is disposed above the first sub-region, and a second part of the black matrix layer is disposed above the second sub-region. An area of the first sub-region is defined by two adjacent ones of a plurality of first signal lines and two adjacent ones of a plurality of second signal lines. An area of the second sub-region is defined by another two adjacent ones of the plurality of first signal lines and another two adjacent ones of the plurality of second signal lines. The area of the second sub-region is greater than the area of the first sub-region.

7 Claims, 10 Drawing Sheets

Related U.S. Application Data continuation of application No. 17/325,177, filed on
May 19, 2021, now Pat. No. 11,710,437.

a2'

| 321W1 b2' | 324W1 | 327W1 |
| 321W2 | 324W2 | 327W2 |
| 321W3 | 324W3 | 327W3 |
| 322W1 | 325W1 | 328W1 |
| 322W2 | 325W2 | 328W2 |
| 322W3 | 325W3 | 328W3 |
| 323W1 | 326W1 | 329W1 |
| 323W2 | 326W2 | 329W2 |
| 323W3 | 326W3 | 329W3 |

320

D1"

D4"

G0"

W3

411W b3    a3

T1"

G9"

412W

V2

V3    V1

410

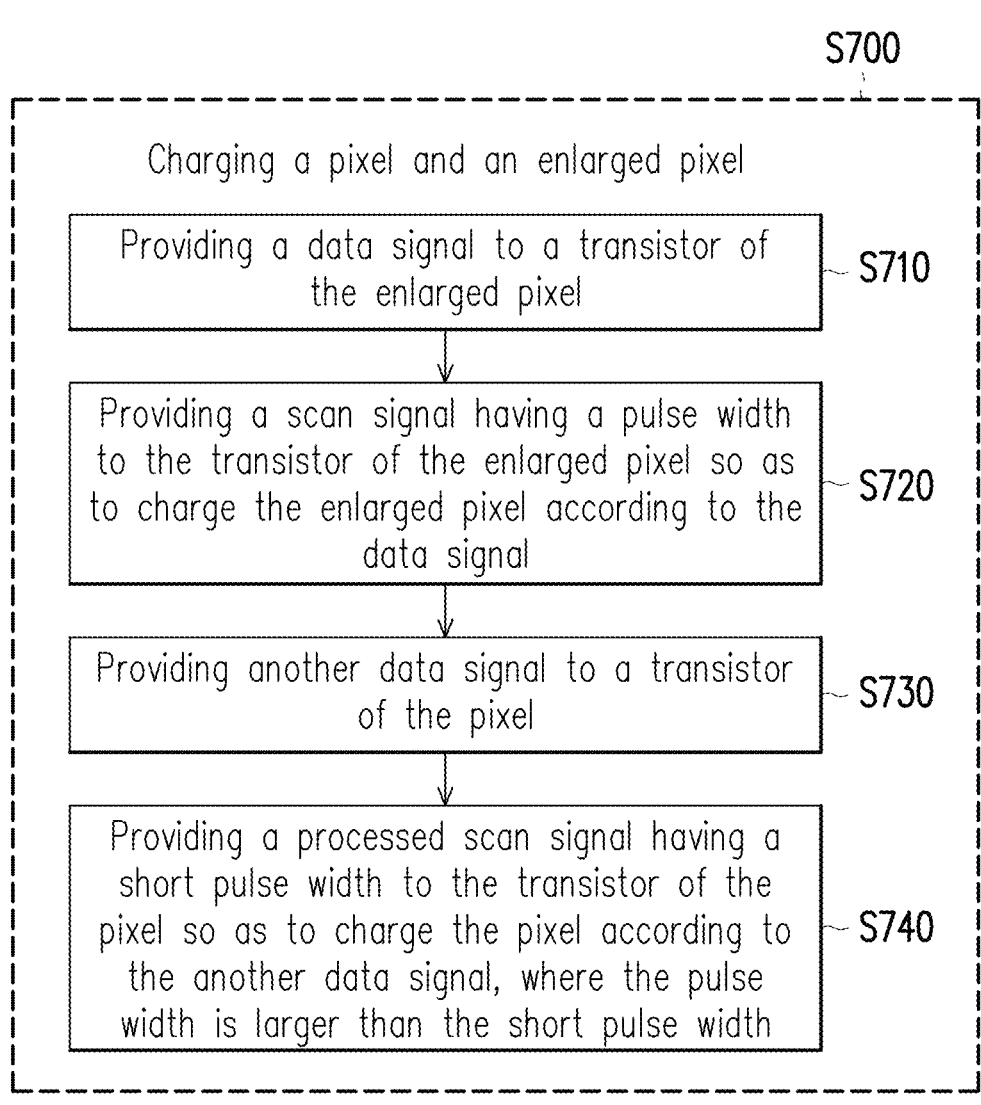

S700

Charging a pixel and an enlarged pixel

Providing a data signal to a transistor of the enlarged pixel — S710

Providing a scan signal having a pulse width to the transistor of the enlarged pixel so as to charge the enlarged pixel according to the data signal — S720

Providing another data signal to a transistor of the pixel — S730

Providing a processed scan signal having a short pulse width to the transistor of the pixel so as to charge the pixel according to the another data signal, where the pulse width is larger than the short pulse width — S740

FIG. 7

ELECTRONIC DEVICE

CROSS-REFERENCE TO RELATED APPLICATION

This application is a continuation application of and claims the priority benefit of U.S. application Ser. No. 18/329,602, filed on Jun. 6, 2023. The prior U.S. application Ser. No. 18/329,602 is a continuation application of and claims the priority benefit of U.S. application Ser. No. 17/325,177, filed on May 19, 2021, which claims the priority benefit of China application serial no. 202010567490.9, filed on Jun. 19, 2020. The entirety of each of the above-mentioned patent applications is hereby incorporated by reference herein and made a part of this specification.

BACKGROUND

1. Technical Field

This disclosure relates to an electronic device, and in particular to an electronic device having a general region and a functional region.

2. Description of Related Art

In the current design of under-screen camera display, the camera is set behind the LCD panel, serious light diffraction problem caused by the display array and the color filter pattern results in unclear imaging of the camera. In view of this, solutions are proposed in several embodiments below.

SUMMARY

An electronic device having a general region and a functional region is provided to improve an imaging quality of a sensing device under a screen.

According to an embodiment of the disclosure, the general region includes a first sub-region, and the functional region includes a second sub-region. The electronic device includes a black matrix layer, a plurality of first signal lines extending along a first direction, and a plurality of second signal lines extending along a second direction different from the first direction. A first part of the black matrix layer is disposed above the first sub-region, and a second part of the black matrix layer is disposed above the second sub-region. An area of the first sub-region is defined by two adjacent ones of the plurality of first signal lines and two adjacent ones of the plurality of second signal lines. An area of the second sub-region is defined by another two adjacent ones of the plurality of first signal lines and another two adjacent ones of the plurality of second signal lines. The area of the second sub-region is greater than the area of the first sub-region.

In order to make the above features and advantages of the embodiments more obvious and understandable, the embodiments are specifically described below in conjunction with the drawings for detailed description as follows.

BRIEF DESCRIPTION OF THE DRAWINGS

The accompanying drawings are included to provide a further understanding of the disclosure, and are incorporated in and constitute a part of the disclosure. The drawings illustrate embodiments of the disclosure and, together with the description, serve to explain the principles of the disclosure.

FIG. 7 is a flow chart of the method for charging according to an embodiment of the disclosure.

DESCRIPTION OF THE EMBODIMENTS

Figure 1:
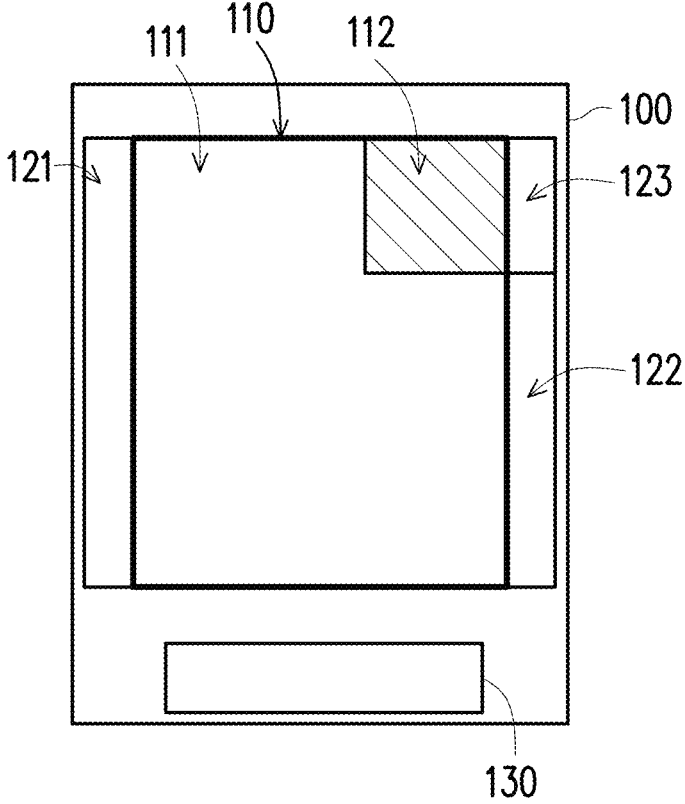
FIG. 1 is a schematic diagram of a top view of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . "

The directional terms mentioned in the following, such as "upper", "lower", "front", "rear", "left", "right", and the like, are just references to the direction of the attached drawings. Therefore, the directional terms are used to illustrate, not to limit, the disclosure. In the drawings, each drawing shows the general features of the methods, structures and/or materials adopted in specific embodiments, but the drawings should not be construed as defining or limiting the scope or nature covered by the embodiments. For example, for the sake of clarity, the relative size, thickness, and position of each layer, region and/or structure may be reduced or enlarged.

When a corresponding component such as a film layer or region is referred to as being "on another component", it may be directly on the other component, or there may be other components between the two. On the other hand, when a component is referred to as being "directly on another component", there is no component between the two. Moreover, when a component is referred to as being "on another component", the two have a vertical relationship in the top view direction, and the component may be above or below the other component, and the vertical relationship depends on the orientation of the device.

In some embodiments of the disclosure, unless specifically defined, terms related to bonding and connection, such as "connect", "interconnect" and the like may mean the two structures are in direct contact, or that the two structures are not in direct contact and there are other structures disposed between the two. Further, the terms related to bonding and connection may also include the case where both structures are movable or both structures are fixed. In addition, the term "coupled" includes any direct and indirect electrical means of connection.

The ordinal numbers used in the specification and claims, such as "first", "second" and the like, to qualify a component do not imply or represent that the component or components are preceded with any ordinal numbers, nor do they represent the order of a certain component and another component, or the order in the manufacturing method. The ordinals numbers are used only so as to clearly distinguish a component with one name from another component with the same name. Different terms may be used in the claims and the specification, and accordingly, a first component in the specification may be a second component in the claims.

The terms "about", "substantially" or "approximately" are generally interpreted as being within 20% of a given value or range, or interpreted as being within 10%, within 5%, within 3%, within 2%, within 1%, within 0.5% or less of a given value or range. The quantity given here is an approximate quantity, that is, the meaning of "about" may still be implied without a specific description of "about". It should be noted that in the following embodiments, the technical features of several different embodiments may be replaced, recombined, and mixed without departing from the spirit of the disclosure to complete other embodiments.

The electronic device disclosed in the disclosure may include, for example, a display device, an antenna device, a sensing device, a touch display, a curved display, a free shape display, but the disclosure is not limited thereto. The electronic display may also be a bendable or flexible tiled device. The electronic device may, for example, include liquid crystal, light emitting diode, quantum dot (QD), fluorescence, phosphor, other suitable display medium, or the combination of the aforementioned material, but the disclosure is not limited thereto. The light emitting diode may include, for example, organic light emitting diode (OLED), sub-millimeter light emitting diode (Mini LED), micro light emitting diode (Micro LED), or quantum dot light emitting diode (QLED or QDLED) or other suitable materials. The materials may be arranged and combined arbitrarily, but the disclosure is not limited to thereto. The display device may, for example, include spiced display device, but the disclosure not limited thereto. The antenna device may be, for example, liquid crystal antenna, but the disclosure is not limited thereto. The antenna device may include, for example, spliced antenna device, but the disclosure is not limited thereto. It should be noted that the electronic device may be any arbitrary arrangement and combination described above, but the disclosure is not limited thereto. In addition, the appearance of the electronic device may be a rectangle, a circle, a polygon, a shape with a bending edge, or other suitable shapes. The electronic device may have peripheral systems such as driving system, control system, light source system, shelf system, and the like to support the electronic device, the antenna device or the spliced device. The electronic device will be used in the following to illustrate the content of the disclosure, but the disclosure is not limited thereto.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1 is a schematic diagram of a top view of an electronic device according to an embodiment of the disclosure. With reference to FIG. 1, an electronic device 100 includes a display region 110, and a peripheral region outside the display region 110 may include a first vertical shift register circuit 121, a first vertical shift register circuit 122, a second vertical shift register circuit 123, and an outer lead bonding (OLB) region 130. The outer lead bonding region 130 may be provided with a flexible printed circuit (FPC), a chip on film (COF) or a related display drive circuit, for example. The display region 110 is formed on a horizontal plane formed by a first direction V1 and a second direction V2, where the first direction V1 may be, for example, an extending direction of a data line or a gate line; the disclosure is not limited thereto. The second direction V2 is perpendicular to the first direction V1, and a third direction V3 may be perpendicular to the horizontal plane formed by the first direction V1 and the second direction V2. In other words, the first direction V1, the second direction V2, and the third direction V3 may be perpendicular to each other. In the present embodiment, the display region 110 of the electronic device 100 includes a general display region 111 (i.e., general region) and a camera display region 112 (i.e., functional region), and the electronic device 100 may further provide an image sensing unit (not shown) under the camera display region 112. Moreover, a first vertical shift registers (VSR) circuit 121, a first vertical shift registers circuit 122, and a second vertical shift register circuit 123 may respectively include multiple vertical shift registers to be respectively coupled to and drive each row of pixels in a pixel array in the general display region 111 and the camera display region 112. It should be noted that the position of the camera display region 112 and the position of the second vertical shift register circuit 123 are not limited to FIG. 1. In some embodiments, the display region 110 may include more than one camera display region, but the disclosure is not limited thereto. In an embodiment, the position of the camera display region 112 may be designed correspondingly according to different usage requirements, and the second vertical shift register circuit 123 may be adjusted correspondingly according to the position of the camera display region 112.

Specifically, in the present embodiment, the general display region 111 includes multiple pixels, and the camera display region 112 includes multiple enlarged pixels. The first vertical shift register circuit 121 and the first vertical shift register circuit 122 are configured to charge the multiple pixels of the general display region 111, and the second vertical shift register circuit 123 is configured to charge the multiple enlarged pixels of the camera display region 112. It is worth noting that the enlarged pixel of the present embodiment may be, for example, combined by the multiple pixels. Therefore, in the present embodiment, the enlarged pixel has a storage greater than a storage capacitance of the enlarged pixel, and an area of a pixel region of the enlarged pixel is greater than an area of a pixel region of the pixel. More specifically, an area of a pixel electrode (not shown) of the enlarged pixel is greater than an area of a pixel electrode (not shown) of the pixel. Furthermore, since the enlarged pixel has a greater storage capacitance, the second vertical shift register circuit 123 charges the enlarged pixel in a greater amount of time than the first vertical shift register circuit 121 and the first vertical shift register circuit 122 charging the pixel.

Figures 2A, 2B:
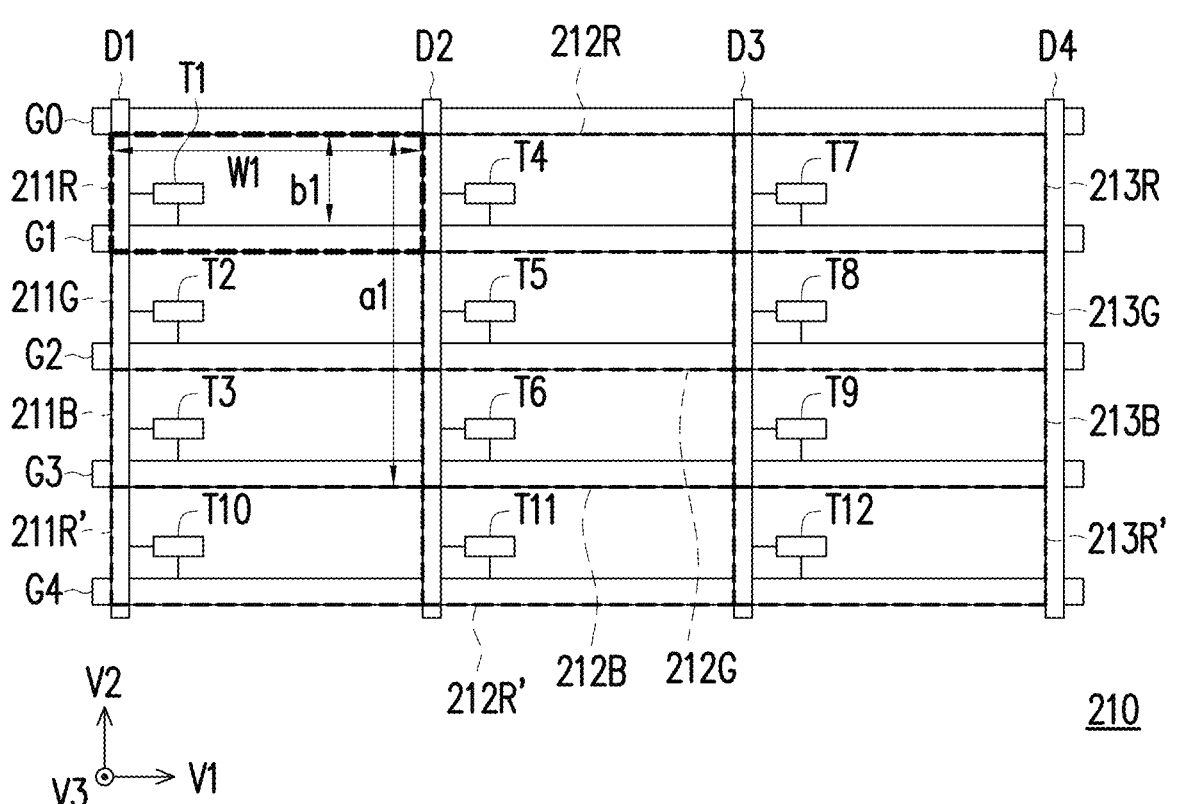
FIG. 2A is a schematic diagram of multiple pixels in a display region of an electronic device according to an embodiment of the disclosure.
FIG. 2B is a schematic diagram of a black matrix layer corresponding to a pixel array of FIG. 2A.

FIG. 2A is a schematic diagram of multiple pixels in a display region of an electronic device according to an embodiment of the disclosure. With reference to FIG. 2A, a pixel array 210 of the present embodiment is a schematic diagram of at least a part of the pixel array of the general display region 111 of FIG. 1. In the present embodiment, the pixel array 210 includes multiple data lines D1-D4, multiple gate lines G0-G4, as well as multiple pixels arranged in an array. The multiple pixels may, for example, include multiple red pixels 211R, 212R, 213R, 211R', 212R', 213R', multiple green pixels 211G, 212G, 213G, and multiple blue pixels 211B, 212B, 213B. Also, the multiple pixels may be divided into their respective pixel regions by the data lines D1-D4 and the gate lines G0-G4. In the present embodiment, thin film transistors (TFT) T1, T4, and T7 of the red pixels 211R, 212R, and 213R are coupled to the gate line G1, and are respectively coupled to the data lines D1, D2, and D3. Thin film transistors T2, T5, and T8 of the green pixels 211G, 212G, and 213G are coupled to the gate line G2, and are respectively coupled to the data lines D1, D2, and D3. Thin film transistors T3, T6, and T9 of the blue pixels 211B, 212B, and 213B are coupled to the gate line G3, and are respectively coupled to the data lines D1, D2, and D3. Thin film transistors T10, T11, and T12 of the red pixels 211R', 212R', and 213R' are coupled to the gate line G4, and are respectively coupled to the data lines D1, D2, and D3. It is worth noting that the arrangement for pixel colors of the pixel array 210 of the disclosure is not limited to red, green, and blue arranged in sequence along the data line extending direction, as shown in FIG. 2. In some embodiments, the pixel arrangement for the pixel array 210 disclosed in the disclosure may also be red, green, and blue arranged in sequence along the gate line extending direction. In another embodiment, the arrangement for the pixel array may also be sub-pixel rendering (SPR), but the disclosure is not limited thereto. In other embodiments, the multiple pixels of the pixel array 210 may also include pixels of other colors. For example, the pixel array 210 may include pixels of red, green, blue, and white colors, but the disclosure is not limited thereto. In this regard, the colors of the multiple pixels of the pixel array 210 may be the colors generated by self-luminescence or generated by a color filter (CF); the disclosure is not limited thereto.

In the present embodiment, each pixel in the pixel array 210 may be, for example, a region enclosed by two adjacent gate lines and two adjacent data lines. In some embodiments, the two adjacent gate lines are two gate lines having the same function, and there is no other gate line with the same function as the above two gate lines between the two gate lines having the same function; the two adjacent data lines are two data lines having the same function, and there are no other data lines with the same function as the above two data lines between the two data lines having the same function, but the disclosure is not limited thereto.

In the present embodiment, the red pixel 211R may be a region enclosed by a lower edge of the gate line G0, a lower edge of the adjacent gate line G1, a left edge of the data line D1, and a left edge of the adjacent data line D2 (in thick dashed frame). In other embodiments, the red pixel 211R may also be region enclosed by a center line extending along the first direction V1 of the gate line G0, a center line extending along the first direction V1 of the adjacent gate line G1, a center line extending along the second direction V2 of the data line D1, and a center line extending along the second direction V2 of the adjacent data line D2. In other embodiments, the red pixel 211R may also be a region enclosed by an upper edge of the gate line G0, an upper edge of the adjacent gate line G1, a right edge of the data line D1, and a right edge of the data line D2, but the disclosure is not limited thereto. The above description on the pixel regions above may also be applied to pixels of other colors, which will not be repeated here.

In the present embodiment, the pixel array 210 has a pixel pitch a1, a pixel width W1, and a pitch b1. The pixel pitch a1 is, for example, a pitch of two most adjacent red pixels along the second direction V2. Specifically, the pixel pitch a1 is, for example, a distance from an upper edge of the red pixel 211R to an upper edge of the red pixel 211R'. In other embodiments, the pixel pitch a1 may also be a distance from a center of the red pixel 211R to a center of the red pixel 211R', but the disclosure is not limited thereto. The pixel width W1 is, for example, a maximum width of the red pixel 211R along the first direction V1. The pitch b1 may be, for example, a maximum distance along the second direction between two adjacent gate lines corresponding to the red pixel 211R. Specifically, the pitch b1 may be a maximum distance along the second direction from a lower edge of the gate line G0 to an upper edge of the adjacent gate line G1.

FIG. 2B is a schematic diagram of a black matrix layer corresponding to a pixel array of FIG. 2A. Referring to FIG. 2A and FIG. 2B, in the present embodiment, a black matrix (BM) layer 220 and the color filter layer may be provided on the pixel array 210. As shown in FIG. 2B, the black matrix layer 220 may have multiple apertures, and the multiple apertures may respectively expose part of the pixels. For example, an aperture 221R of the black matrix layer 220 may be correspondingly disposed above the red pixel 211R of the pixel array 210 so as to expose part of the red pixel 211R. The black matrix layer 220 has a pixel pitch a1' and a pitch b1'. Specifically, the pixel pitch a1' may be a distance along the second direction from an upper edge of the aperture 221R corresponding to the red pixel 211R to an upper edge of an aperture 221R' corresponding to the red pixel 211R'. The pitch b1' may be a maximum distance along the second direction from the upper edge of the aperture 221R to a lower edge of the aperture 221R corresponding to the red pixel 211R. Apertures 221R-223R, 221R'-223R', 221G-223G, and 221B-223B of the black matrix layer 220 may correspond, one-to-one, to the positions of the multiple red pixels 211R, 212R, 213R, 211R', 212R', and 213R' of the pixel array 210, the multiple green pixels 211G, 212G, 213G, and the multiple blue pixels 211B, 212B, and 213B. It should be understood that in some embodiments, the electronic device may not need to include the black matrix layer and/or the color filter layer, but the disclosure is not limited thereto.

Figure 3A:
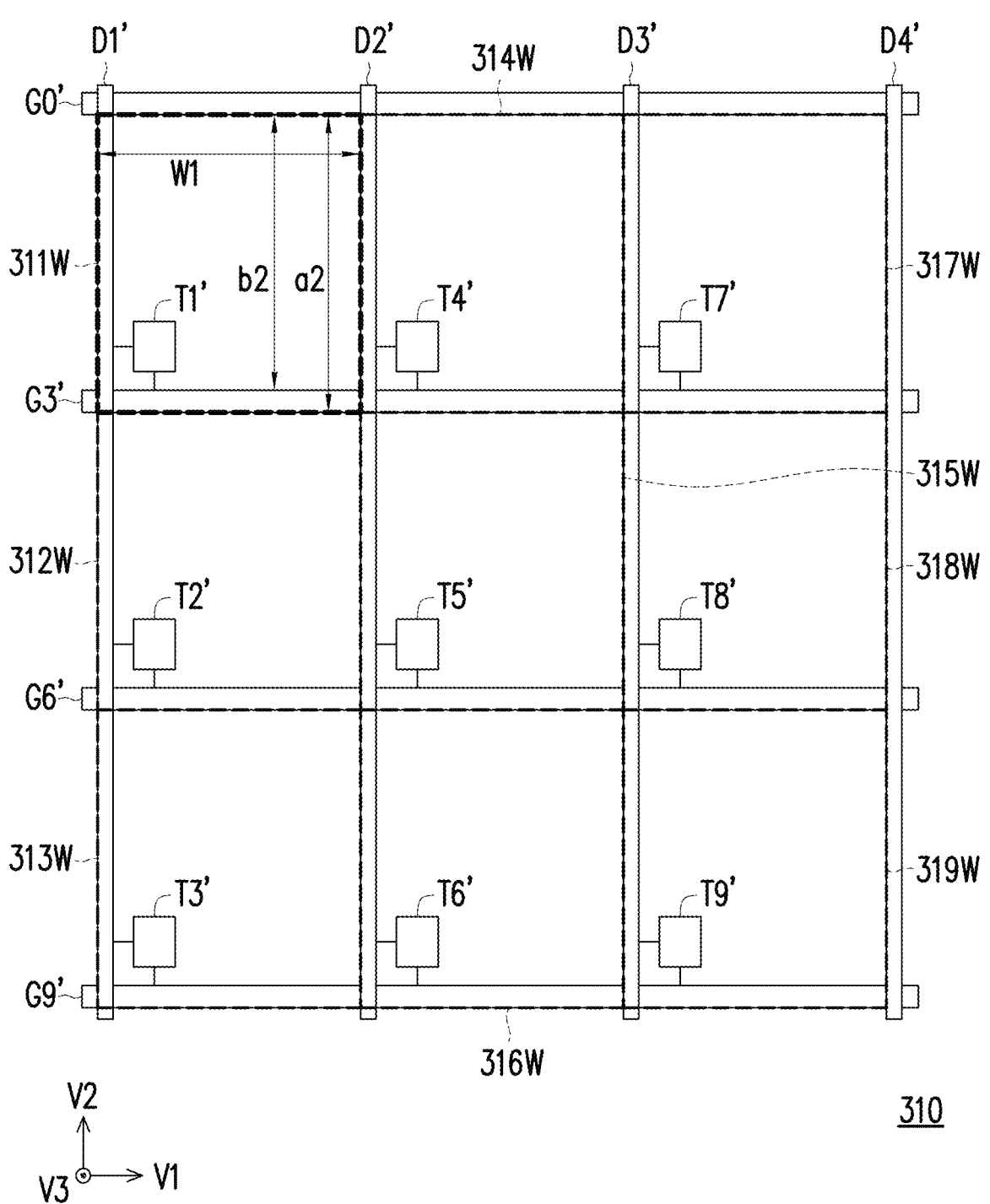
FIG. 3A is a schematic diagram of multiple enlarged pixels of a camera region of an electronic device according to an embodiment of the disclosure.

FIG. 3A is a schematic diagram of multiple enlarged pixels of a camera region of an electronic device according to an embodiment of the disclosure. With reference to FIG. 3A, a pixel array 310 of the present embodiment is a schematic diagram of at least a part of the pixel array of the camera display region 112 of FIG. 1. In the present embodiment, the pixel array 310 includes multiple data lines D1'-D4', multiple gate lines G0', G3', G6', G9', as well as multiple enlarged pixels 311W-319W arranged in an array. The multiple enlarged pixels 311W-319W may be divided into their respective pixel regions by the data lines D1'-D4' and the gate lines G0', G3', G6', and G9'. In the present embodiment, thin film transistors T1', T4', and T7' of the enlarged pixels 311W, 314W, and 317W are coupled to the gate line G3', and are respectively coupled to the data lines D1'-D3'. Thin film transistors T2', T5', and T8' of the enlarged pixels 312W, 315W, and 318W are coupled to the gate line G6', and are respectively coupled to the data lines D1'-D3'. Thin film transistors T3', T6', and T9' of the enlarged pixels 313W, 316W, and 319W are coupled to the gate line G9', and are respectively coupled to the data lines D1'-D3'. With reference to FIG. 2A, the pixel array 310 of the present embodiment may be, for example, an enlarged pixel combined by a corresponding red pixel, a corresponding green pixel, and a corresponding blue pixel. For example, the enlarged pixel 311W may be a result of integrating the red pixel 211R, the green pixel 211G, and the blue pixel 211B of the pixel array 210 as shown in FIG. 2A. In other words, a pixel region of the enlarged pixel 311W may be equal to a pixel region of the red pixel 211R, the green pixel 211G, and the blue pixel 211B combined together. Also, the range of a pixel region of the enlarged pixel 312W-319W may be deduced likewise, which will therefore not be repeated here.

In the present embodiment, each enlarged pixel in the pixel array 310 may be, for example, a region enclosed by two adjacent gate lines and two adjacent data lines. In some embodiments, the two adjacent gate lines are two gate lines having the same function, and there is no other gate line with the same function as the above two gate lines between the two gate lines having the same function; the two adjacent data lines are two data lines having the same function, and there are no other data lines with the same function as the above two data lines between the two data lines having the same function, but the disclosure is not limited thereto.

In the present embodiment, the enlarged pixel 311W may be a region enclosed by a lower edge of the gate line G0', a lower edge of the adjacent gate line G3', a left edge of the data line D1', and a left edge of the adjacent data line D2' (in thick dashed frame). In other embodiments, the enlarged pixel 311W may also be a region enclosed by a center line extending along the first direction V1 of the gate line G0', a center line extending along the first direction V1 of the adjacent gate line G3', a center line extending in the second direction V2 of the data line D', and a center line extending along the second direction V2 of the data line D2'. In other embodiments, the enlarged pixel 311W may also be a region enclosed by an upper edge of the gate line G0', an upper edge of the adjacent gate line G3', a right edge of the data line D1', and a right edge of the data line D2', but the disclosure is not limited thereto. The above description on the pixel region may also be applied to other enlarged pixels, which will not be repeated here.

In the present embodiment, the pixel array 310 has a pixel pitch a2 and the pixel width W1, and each pixel of the pixel array 310 has a pitch (aperture size) b2. The pixel pitch a2 is, for example, a pitch along the second direction V2 between the enlarged pixel 311W and the closest enlarged pixel 312W. Specifically, the pixel pitch a2 is, for example, a distance from an upper edge of the enlarged pixel 311W to an upper edge of the enlarged pixel 312W. In other embodiments, the pixel pitch a2 may also be a distance from a center of the enlarged pixel 311W to a center of the enlarged pixel 312W, but the disclosure is not limited thereto. The pixel width W2 is, for example, a maximum width along the first direction V1 of the enlarged pixel 311W, which is, for example, from a right edge of a linewidth of the data line D1' to a right edge of a linewidth of the data line D2'. The pitch b2 is, for example, a distance between the two adjacent gate lines corresponding to the enlarged pixel 311W. Specifically, the pitch b2 may be a maximum distance along the second direction from a lower edge of the gate line G0' to an upper edge of an adjacent gate line G1'.

It is worth noting that, compared to the red pixel 211R, the green pixel 211G, and the blue pixel 211B in FIG. 2A, the enlarged pixel 311W is reduced by two gate lines G1 and G2. Therefore, the pixel pitch a2 of the pixel array 310 may be greater than the pixel pitch a1 of the pixel array 210. For example, the pixel pitch a2 of the pixel array 310 may be three times the pixel pitch a1 of the pixel array 210. Furthermore, since a ratio of the pitch b2 to the pixel pitch a2 of the pixel array 310 is greater than a ratio of the pitch b1 to the pixel pitch a1 of the pixel array 210 (b2/a2>b1/a1), an aperture ratio of the pixel array 310 is greater than an aperture ratio of the pixel array 210. In other words, for the pixel array design of the present embodiment, the aperture ratio of at least one enlarged pixel in the camera display region 112 of FIG. 1 may be greater than the aperture ratio of at least one pixel in the general display region 111, and a resolution of the general display region 111 is higher than a resolution of the camera display region 112. Therefore, when the image sensing unit is provided below the pixel array 310, compared to being provided under the pixel array 210, diffraction can be lowered, and the pixel array 310 has better light transmission, thereby improving the imaging quality of the image sensing unit.

Figure 3B:
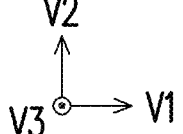
FIG. 3B is a schematic diagram of a black matrix layer corresponding to a pixel array of FIG. 3A.

FIG. 3B is a schematic diagram of a black matrix layer corresponding to a pixel array of FIG. 3A. Referring to FIG. 3A and FIG. 3B, in the present embodiment, a black matrix layer 320 may be optionally provided on the pixel array 310. It should be noted that in the present embodiment, the color filter layer may not need to be provided on the pixel array 310. As shown in FIG. 3B, the black matrix layer 320 may have multiple apertures, and the multiple apertures may respectively expose part of the pixels. For example, apertures 321W1-321W3 of the black matrix layer 320 may be correspondingly disposed above the enlarged pixels 311W of the pixel array 310 so as to expose part of the enlarged pixels 311W, and the black matrix layer 320 has a pixel pitch a2' and a pitch b2'. Specifically, the pixel pitch a2' may be a distance along the second direction from an upper edge of the aperture 321W1 corresponding to the enlarged pixel 311W to an upper edge of another adjacent aperture 321W2 corresponding to the enlarged pixel 311W. The pitch b2' may be a maximum distance along the second direction from an upper edge to a lower edge of the aperture 321W1 corresponding to the enlarged pixel 311W. Likewise, the apertures 321W1-321W3, apertures 322W1-322W3, apertures 323W1-323W3, apertures 324W1-324W3, apertures 325W1-325W3, apertures 326W1-326W3, apertures 327W1-327W3, apertures 328W1-328W3, and apertures 329W1-329W3 of the black matrix layer 320 may correspond to the positions of the multiple enlarged pixels 311W-319W of the pixel array 310 in a three-to-one manner. It is worth noting that, different from the pixel pitch a1' of FIG. 2B, since the enlarged pixels 311W-319W may be used to display the same color (for example, white) or to display no color, the pixel pitch a2' may be, for example, the distance between upper edges of two adjacent apertures.

Furthermore, since a ratio of the pitch b2' to the pixel pitch a2' of the black matrix layer 320 is greater than a ratio of the pitch b1' to the pixel pitch a1' of the black matrix layer 220 (b2'/a2'>b1'/a1'), an aperture ratio of the black matrix layer 320 is greater than an aperture ratio of the black matrix layer 220. In other words, for the design of the black matrix layer of the present embodiment, the aperture ratio of the camera display region 112 in FIG. 1 may be greater than the aperture ratio of the general display region 111. Therefore, when the image sensing unit is provided under the pixel array 310 and the black matrix layer 320, compared to being provided under the pixel array 210 and the black matrix layer 220, diffraction can be lowered, and the pixel array 310 can have better light transmission, thereby improving the imaging quality of the image sensing unit.

Figure 3C:
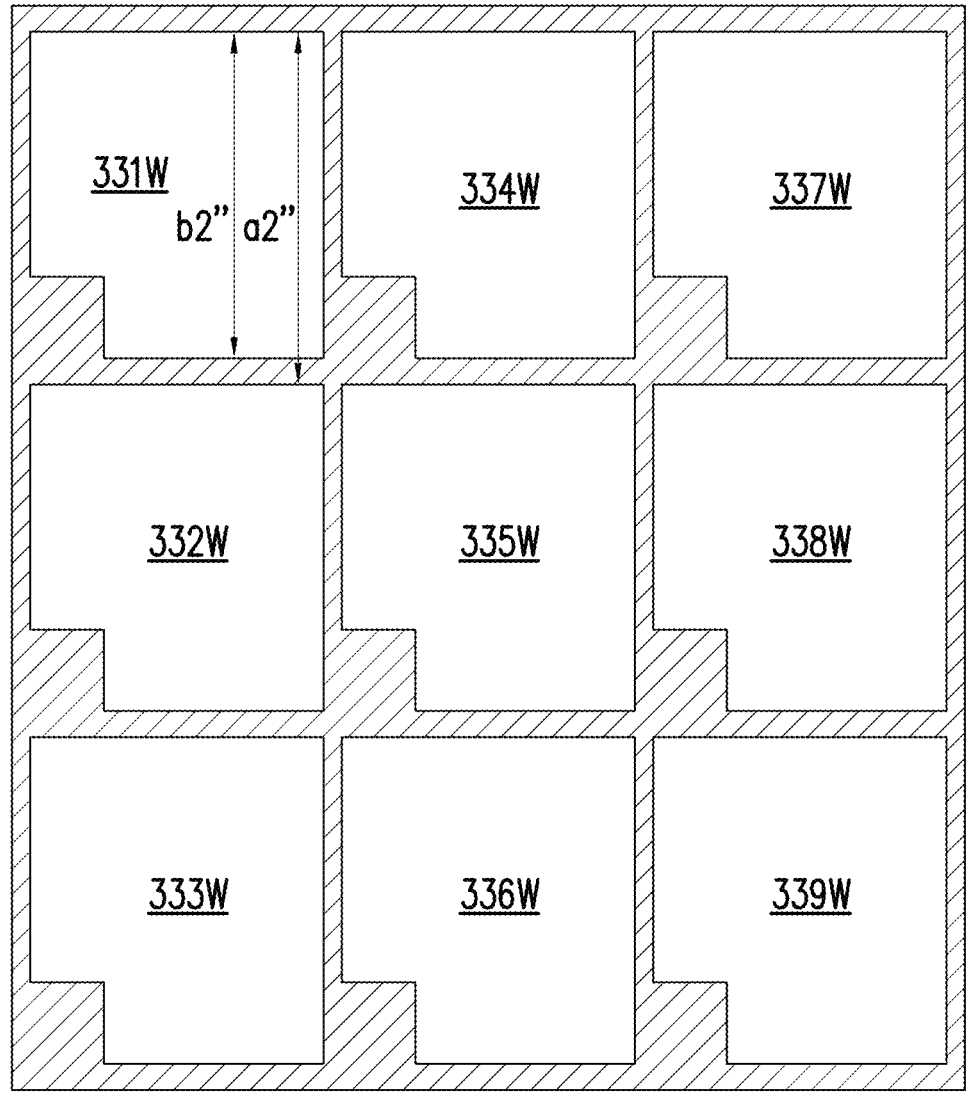
FIG. 3C is a schematic diagram of another black matrix layer corresponding to a pixel array of FIG. 3A.
Figure 3C:
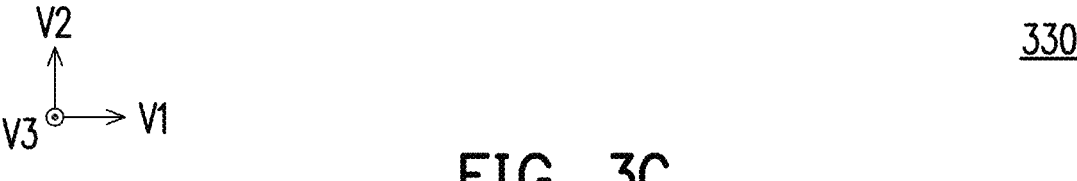

FIG. 3C is a schematic diagram of another black matrix layer corresponding to a pixel array of FIG. 3A. Referring to FIG. 3A and FIG. 3C, in the present embodiment, a black matrix layer 330 may be optionally provided on the pixel array 310. As shown in FIG. 3C, the black matrix layer 330 may have multiple apertures, and the multiple apertures may respectively expose part of the pixels. For example, an aperture 331W1 of the black matrix layer 330 may be correspondingly disposed above an enlarged pixel 311W of the pixel array 310 so as to expose part of the enlarged pixels 311W, and the black matrix layer 330 has a pixel pitch a2" and a pitch b2". Specifically, the pixel pitch a2" may be a distance along the second direction from an upper edge of the aperture 331W corresponding to the enlarged pixel 311W to an upper edge of the aperture 332W corresponding to the enlarged pixel 312W. The pitch b2' may be a maximum distance along the second direction from an upper edge to a lower edge of the aperture 331W corresponding to the enlarged pixel 311W. Likewise, apertures 331W-339W of the black matrix layer 330 may correspond, one-to-one, to the positions of the multiple enlarged pixels 311W-319W of the pixel array 310. It is worth noting that, different from the pixel pitch a1' of FIG. 2B, since the enlarged pixels 311W-319W may be used to display the same color (for example, white) or to display no color, the pixel pitch a2" may be, for example, the distance between upper edges of two adjacent apertures.

Furthermore, since a ratio of the pitch b2" to the pixel pitch a2" of the black matrix layer 330 is greater than a ratio of the pitch b1' to the pixel pitch a1' of the black matrix layer 220 (b2"/a2">b1'/a1'), an aperture ratio of the black matrix layer 330 is greater than an aperture ratio of the black matrix layer 220. Furthermore, since the ratio of pitch b2" to the pixel pitch a2" of the black matrix layer 330 is greater than the ratio of the black matrix layer 320 pitch b2' to the pixel pitch a2' (b2"/a2">b2'/a2'), the aperture ratio of the black matrix layer 330 is greater than the aperture ratio of the black matrix layer 320. In other words, for the design of the black matrix layer of the present embodiment, the aperture ratio of the camera display region 112 in FIG. 1 may be greater than the aperture ratio of the general display region 111, and the resolution of the general display region 111 can be higher than the resolution of the camera display region 112. Therefore, when the image sensing unit is provided under the pixel array 310 and the black matrix layer 330, compared to being provided under the pixel array 210 and the black matrix layer 220, diffraction can be lowered, and the pixel array 310 can have better light transmission, thereby improving the imaging quality of the image sensing unit.

Figure 4A:
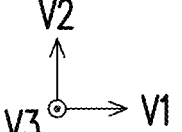
FIG. 4A is a schematic diagram of multiple enlarged pixels of a camera region of an electronic device according to an embodiment of the disclosure.

FIG. 4A is a schematic diagram of multiple enlarged pixels of a camera region of an electronic device according to an embodiment of the disclosure. With reference to FIG. 4A, a pixel array 410 of the present embodiment is a schematic diagram of at least a part of the pixel array of the camera display region 112 of FIG. 1. In the present embodiment, the pixel array 410 includes multiple data lines D1", D4", multiple gate lines G0", G9", and multiple enlarged pixels 411W, 412W, where the enlarged pixel 411W may be divided into their respective pixel regions by the data lines D1" and D4" and the gate lines G0" and G9". In the present embodiment, a thin film transistor T1" of the enlarged pixel 411W is coupled to the gate line G9" and is coupled to the data line D1". With reference to FIG. 3A, the pixel array 410 of the present embodiment may be, for example, a greater enlarged pixel combined by multiple corresponding enlarged pixels. For example, the enlarged pixel 411W may be a result of integrating the nine enlarged pixels 311W-319W of the pixel array 310 as shown in FIG. 3A. In other words, a pixel region of the enlarged pixel 411W may be equal to a pixel region of the enlarged pixels 311W-319W combined together. Moreover, the other multiple enlarged pixels arranged in an array of the other pixel array 410 arranged in an array may be deduced likewise, which will therefore not be repeated here.

In the present embodiment, each enlarged pixel in the pixel array 410 may be, for example, a region enclosed by two adjacent gate lines and two adjacent data lines. In some embodiments, the two adjacent gate lines are two gate lines having the same function, and there is no other gate line with the same function as the above two gate lines between the two gate lines having the same function; the two adjacent data lines are two data lines having the same function, and there are no other data lines with the same function as the above two data lines between the two data lines having the same function, but the disclosure is not limited thereto.

In the present embodiment, the enlarged pixel 411W may be a region enclosed by a lower edge of the gate line G0", a lower edge of the adjacent gate line G9", a left edge of the data line D1", and a left edge of the adjacent data line D4" (in thick dashed frame). In other embodiments, the enlarged pixel 411W may also be an region enclosed by a center line extending along the first direction V1 of the gate line G0", a center line extending along the first direction V1 of the adjacent gate line G9", a center line extending along the second direction V2 of the data line D1", and a center line extending along the second direction V2 of the data line D4". In other embodiments, the enlarged pixel 411W may also be a region enclosed by an upper edge of the gate line G0", an upper edge of the adjacent gate line G9", a right edge of the data line D1", and a right edge of the data line D4", but the disclosure is not limited thereto. The above description on the pixel region may also be applied to other enlarged pixels, which will not be repeated here.

In the present embodiment, the pixel array 410 has a pixel pitch a3 and a pixel width W3, and each pixel of the pixel array 410 has a pitch (aperture size) b3. The pixel pitch a3 is, for example, a pitch along the second direction V2 between the enlarged pixel 411W and the closest enlarged pixel 412W. Specifically, the pixel pitch a3 is, for example, a distance from an upper edge of the enlarged pixel 411W to an upper edge of the enlarged pixel 412W. In other embodiments, the pixel pitch a3 may also be the distance from the center of the enlarged pixel 411W to the center of the enlarged pixel 412W, but the disclosure is not limited thereto. The pixel width W3 is, for example, a maximum width of the enlarged pixel 411W along the first direction V1, which is, for example, from a right edge of the data line D1" to a right edge of the data line D4". The pitch b3 is, for example, a distance between two adjacent gate lines corresponding to the enlarged pixel 411W. Specifically, the pitch b3 may be a maximum distance along the second direction from a lower edge of the gate line G0" to an upper edge of an adjacent gate line G9".

It is worth noting that, compared with the multiple red pixels 211R, 212R, 213R, 211R', 212R', 213R', the multiple green pixels 211G, 212G, 213G, and the multiple blue pixels 211B, 212B, 213B in FIG. 2A, the enlarged pixel 411W may reduce, for example, eight gate lines G1-G8. Therefore, the pixel pitch a3 of the pixel array 410 may be nine times the pixel pitch a1 of the pixel array 210. Furthermore, since a ratio of the pitch b3 to a pixel pitch a3 of pixel array 410 is greater than the ratio of the pitch b1 to the pixel pitch a1 of the pixel array 210 (b3/a3>b1/a1), an aperture ratio of the pixel array 410 is greater than the aperture ratio of the pixel array 210, and a resolution of the general display region 111 is higher than a resolution of the camera display region 112. In other words, for the design of the pixel array of the embodiment, the aperture ratio of the camera display region 112 in FIG. 1 may be greater than the aperture ratio of the general display region 111. Therefore, when the image sensing unit is provided under the pixel array 410, compared to being provided under the pixel array 210, diffraction can be lowered, and the pixel array 310 can have better light transmission, thereby improving the imaging quality of the image sensing unit.

Figure 4B:
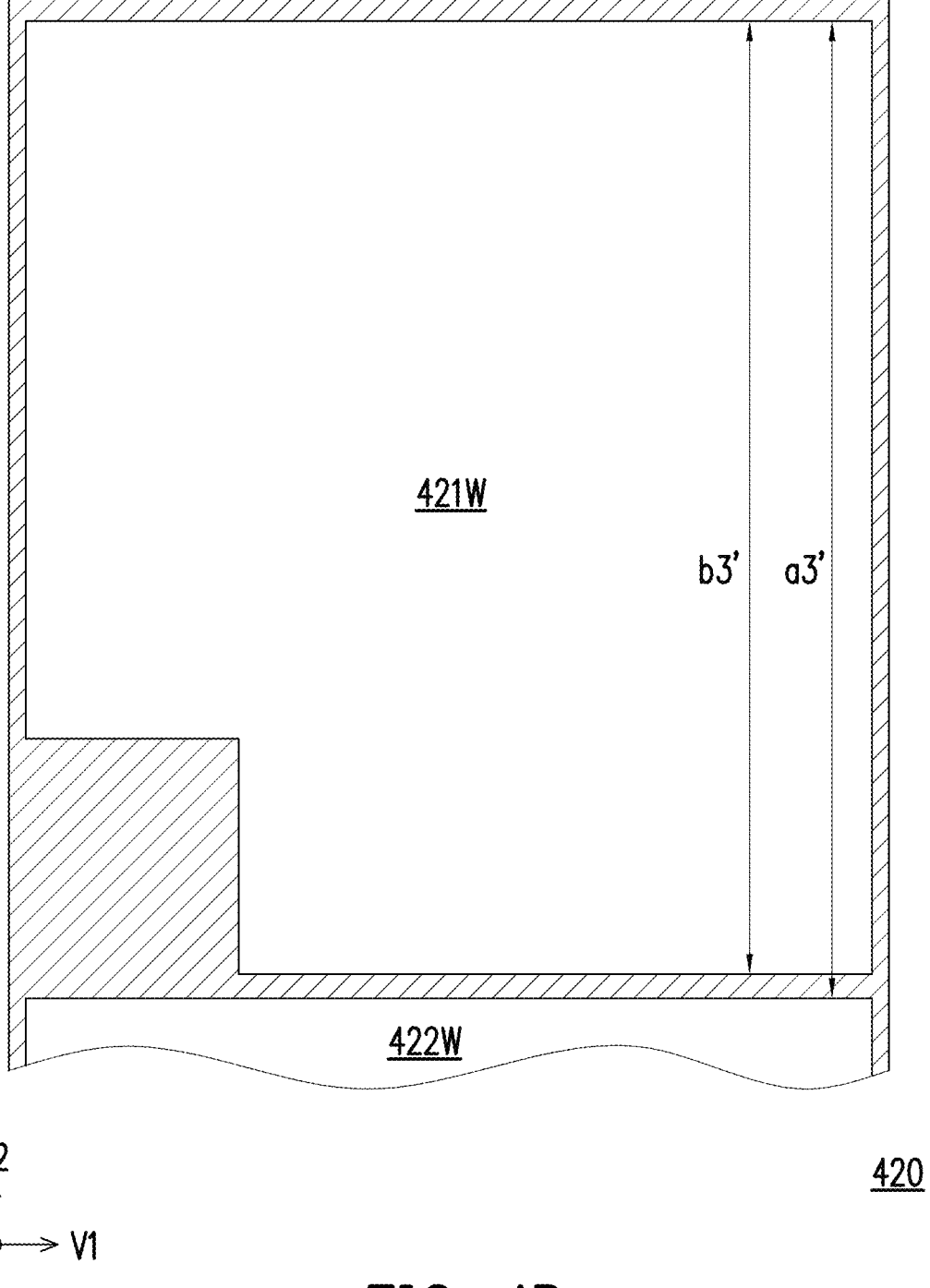
FIG. 4B is a schematic diagram of a black matrix layer corresponding to a pixel array of FIG. 4A.

FIG. 4B is a schematic diagram of a black matrix layer corresponding to a pixel array of FIG. 4A. Referring to FIG. 4A and FIG. 4B, in the present embodiment, a black matrix layer 420 and a color filter layer may be provided on the pixel array 410. As shown in FIG. 4B, the black matrix layer 420 may have multiple apertures, and the multiple apertures may respectively expose part of the pixels. For example, apertures 421W-422W of the black matrix layer 420 may be correspondingly arranged above the enlarged pixels 411W and 412W of the pixel array 410 to expose part of the enlarged pixels 411W and 412W. The black matrix layer 420 has a pixel pitch a3' and a pitch b3'. Specifically, the pixel pitch a3' may be a distance from the upper edge of the aperture 421W corresponding to the enlarged pixel 411W to the upper edge of the aperture 422W corresponding to the enlarged pixel 412W. The pitch b3' may be a distance from an upper edge to a lower edge of the aperture 421W corresponding to the enlarged pixel 411W. Likewise, apertures 421W, 422W of the black matrix layer 420 may correspond, one-to-one, to the positions of the multiple enlarged pixels 411W, 412W of the pixel array 410. It is worth noting that, different from the pixel pitch a1' of FIG. 2B, since the enlarged pixels 421W, 422W may be used to display the same color (for example, white) or to display no color, the pixel pitch a3' may be, for example, the distance between upper edges of two adjacent apertures.

Furthermore, since a ratio of the pitch b3' to the pixel pitch a3' of the black matrix layer 420 is greater than the ratio of the pitch b1' to the pixel pitch a1' of the black matrix layer 220 (b3'/a3'>b1'/a1'), an aperture ratio of the black matrix layer 420 is greater than an aperture ratio of the black matrix layer 220. In other words, for the design of the black matrix layer of the embodiment, the aperture ratio of the camera display region 112 in FIG. 1 may be greater than the aperture ratio of the general display region 111. Therefore, when the image sensing unit is provided under the pixel array 410 and the black matrix layer 420, compared than being provided under the pixel array 210 and the black matrix layer 220, diffraction can be lowered, and the pixel array 310 can have better light transmission, thereby improving the imaging quality of the image sensing unit.

Figure 5A:
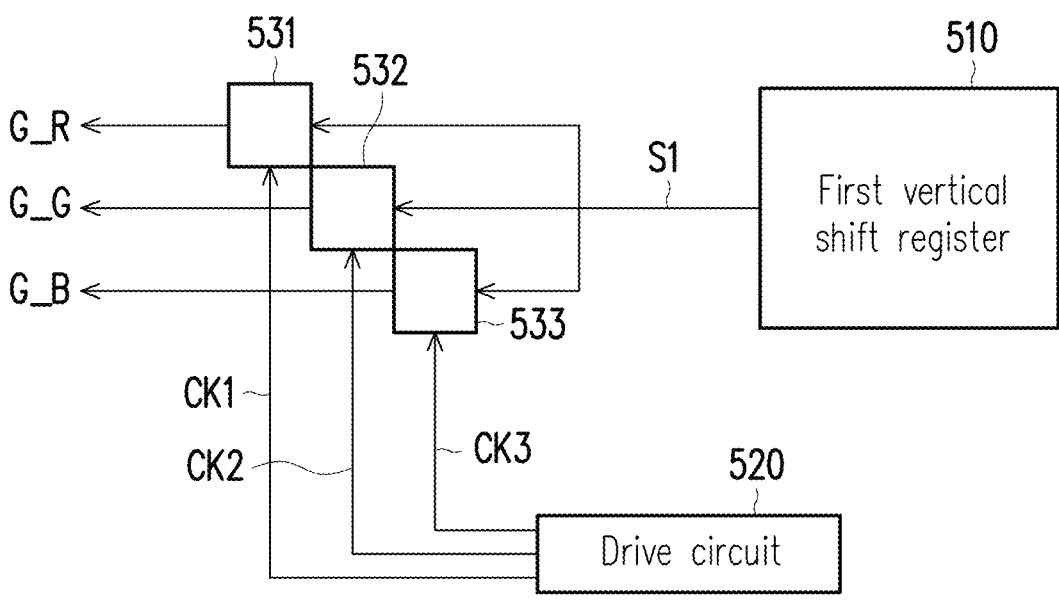
FIG. 5A is a schematic circuit diagram of a driving architecture of a pixel according to an embodiment of the disclosure.
Figure 5B:
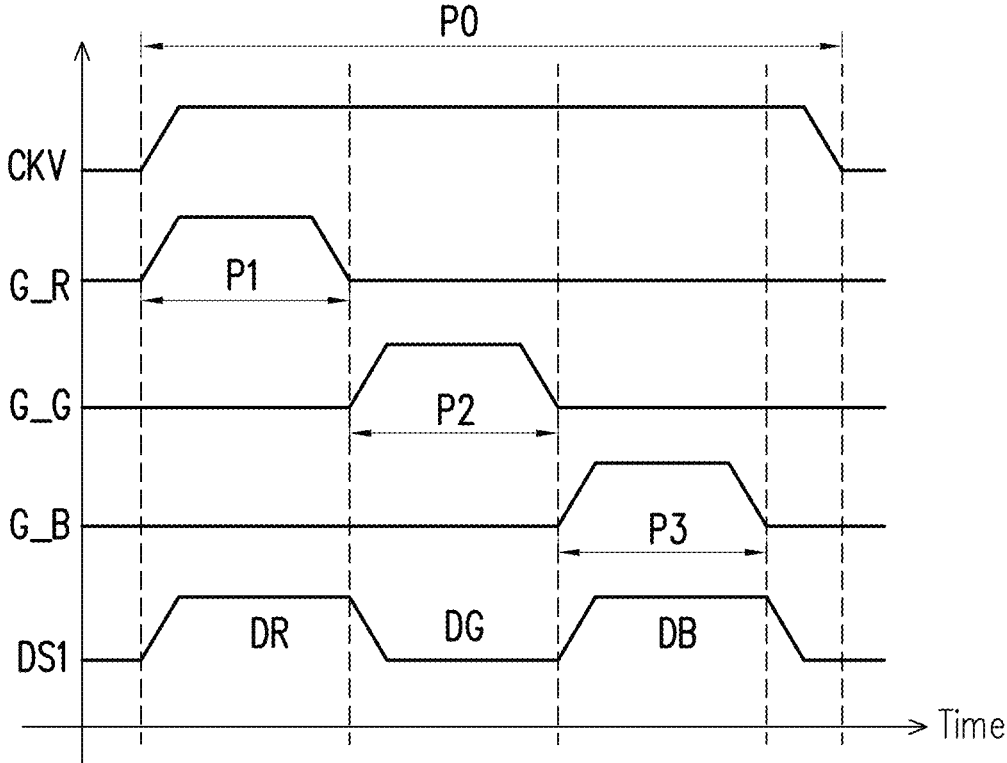
FIG. 5B is a signal timing diagram of a driving architecture according to an embodiment of FIG. 5A of the disclosure.

FIG. 5A is a schematic circuit diagram of a driving architecture of a pixel according to an embodiment of the disclosure. FIG. 5B is a signal timing diagram of a driving architecture according to an embodiment of FIG. 5A of the present disclosure. With reference to FIG. 1, FIG. 5A and FIG. 5B, the first vertical shift register circuit 121 and the first vertical shift register circuit 122 of FIG. 1 may include a first vertical shift register 510 and demultiplexers 531-533 of FIG. 5A, and the outer lead bonding region 130 may include a drive circuit 520 shown in FIG. 5A. In the present embodiment, the demultiplexers 531-533 are coupled to the first vertical shift register 510 and the drive circuit 520, and the demultiplexers 531-533 are respectively coupled to at least one red pixel, at least one green pixel, and at least one blue pixel transistor in the general display region 111. The drive circuit 520 may be additionally coupled to the at least one red pixel, the at least one green pixel, and the at least one blue pixel. As shown in a data timing DS1 of FIG. 5B, the drive circuit 520 may respectively provide data signals DR, DG, and DB to the respective transistors of the at least one red pixel, the at least one green pixel, and the at least one blue pixel. In addition, the drive circuit 520 also provides multiple clock signals CK1, CK2, CK3 to the demultiplexers 531-533, respectively, and the first vertical shift register 510 provides a scan signal S1 to the demultiplexers 531-533, such that the processed scan signals G_R, G_G, and G_B having shorten pulse widths is generated from the scan signal S1 according to the clock signals CK1, CK2, and CK3 and provided to the at least one red pixel, the at least one green pixel, and the at least one blue pixel. It is worth noting that a clock signal CKV in FIG. 5 corresponds to the scan signal S1 and represents the driving time of a pixel group (a red pixel, a green pixel, and a blue pixel), which has a pulse width P0. The clock signals CK1, CK2, CK3 may, for example, sequentially correspond to the shorten pulse widths P1, P2, P3 of the processed scan signals G_R, G_G, and G_B. In the present embodiment, the pulse width P0 of the pixel group may be greater than and/or equal to a sum of the shorten pulse widths P1, P2, and P3 of the processed scan signals G_R, G_G, and G_B (that is, P0≥P1+P2+P3).

Figure 6A:
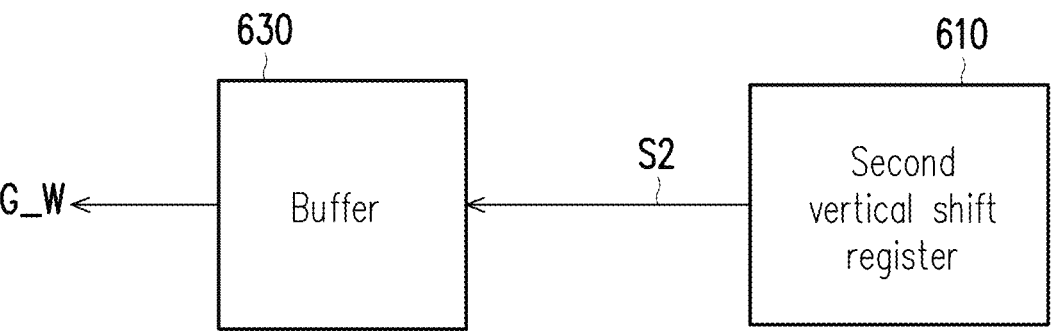
FIG. 6A is a schematic circuit diagram of a driving architecture of an enlarged pixel according to an embodiment of the disclosure.
Figure 6B:
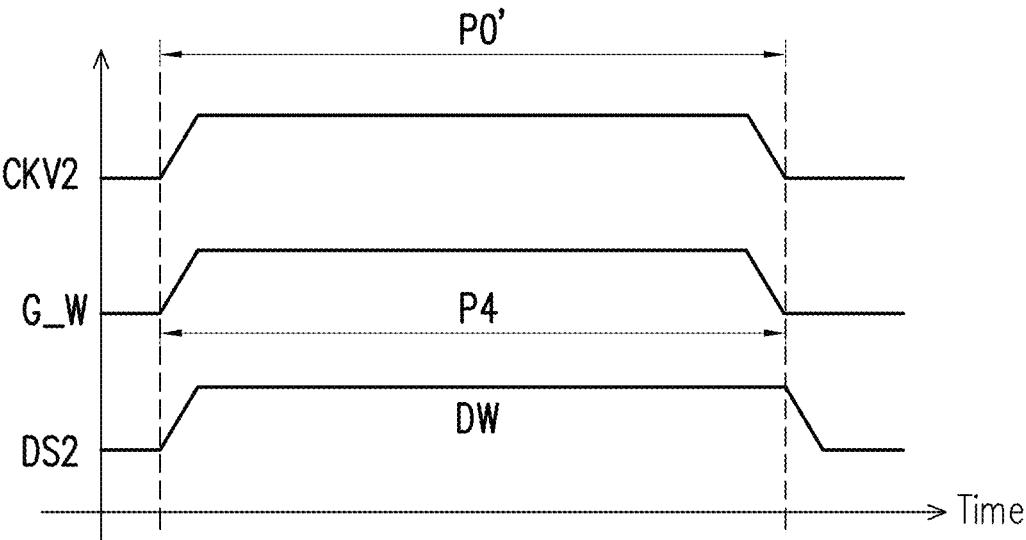
FIG. 6B is a signal timing diagram of a driving architecture according to an embodiment of FIG. 6A of the disclosure.

FIG. 6A is a schematic circuit diagram of a driving architecture of an enlarged pixel according to an embodiment of the disclosure. FIG. 6B is a signal timing diagram of a driving architecture according to an embodiment of FIG. 6A of the disclosure. With reference to FIG. 1, FIG. 6A and FIG. 6B, the second vertical shift register circuit 123 in FIG. 1 may include a second vertical shift register 610 and a buffer 630 of FIG. 6A. In the present embodiment, the buffer 630 is coupled to the second vertical shift register 610 and a transistor of at least one enlarged pixel in the camera display region 112. The buffer 630 is coupled to the at least one enlarged pixel. As shown in a data time timing DS2 of FIG. 6B, a drive circuit (not shown) may provide a data signal DW to the transistor of the at least one enlarged pixel. Also, the second vertical shift register 610 provides a scan signal S2 to the buffer 630, such that the buffer 630 provides a scan signal G_W to the transistor of the at least one enlarged pixel according to the scan signal S2, and the scan signal G_W has a pulse width P4. It is worth noting that a clock signal of CKV2 in FIG. 6B corresponds to the scan signal S2 in FIG. 6A and represents the driving time of the at least one enlarged pixel, where a pulse width P0' of the scan signal S2 in FIG. 6A may be equal to the pulse width P4 of the scan signal G_W, and/or the pulse width P0 of the scan signal S1 of FIG. 5A.

In other words, since the area of the pixel region of the enlarged pixel of the camera display region 112 of FIG. 1 (as shown in FIG. 3A or FIG. 4A) is greater than the area of the pixel region of a general pixel of the general display region 111 (as shown in FIG. 2A), the enlarged pixel of the camera display region 112 has a storage capacitance greater than a storage capacitance of the general pixel of the general display region 111. Therefore, referring to the time sequence of both FIG. 5B and FIG. 6B, in order to allow the storage capacitance of the enlarged pixel to be fully charged, the pulse width P4 of the scan signal G_W of the enlarged pixel may be, for example, three or several times as long as the shorten pulse width P1 of the processed scan signal G_R, but the disclosure is not limited thereto. In other embodiments, there may be a switching time between the scan signals, so the pulse width P4 of the scan signal G_W of the enlarged pixel may be about three times or several times as long as the shorten pulse width P1 of the processed scan signal G_R.

FIG. 7 is a flow chart of the method for charging according to an embodiment of the disclosure. With reference to FIG. 1, and FIG. 5A to FIG. 7, step S700 may be performed for the electronic device 100 to charge the general pixel in the general display region 111 and the enlarged pixel in the camera display region 112, such that the enlarged pixel is charged in a greater amount of time than charging the general pixel. Step S700 includes step S710-S740. More specifically, in step S710, the drive circuit provides the data signal to the transistor of the enlarged pixel. In step S720, the second vertical shift register 610 provides the scan signal having pulse width to the transistor of the enlarged pixel, such that the enlarged pixel is charged according to the data signal. In step S730, drive circuit 520 provides another data signal to the transistor of the general pixel. In step S740, the first vertical shift register 510 provides the processed scan signal having shorten pulse width to the transistor of the general pixel through the demultiplexers 531-533, such that the general pixel is charged according to the another data signal. Therefore, according to the method for charging of the present embodiment, the pixel and the enlarged pixel of the electronic device 100 can be effectively charged.

In summary, according to the electronic device of the disclosure, the pixel and enlarged pixel of the electronic device can be effectively charged, especially for the enlarged pixel having greater storage capacitance. Alternately, in the electronic device of the disclosure, an image sensing unit may be configured under the enlarged pixel to implement the image sense function under the screen. Alternatively, in the camera display region of the electronic device of the present disclosure, an enlarged pixel may be formed by combining the general pixels, diffraction can be lowered by reducing the gate lines, and the light transmittance of the camera display region can be effectively reduced, such that the image sensing unit configured under the enlarged pixel can perform image sensing effectively.

Finally, it should be noted that the above embodiments are only used to illustrate the technical solution of the disclosure, but not limited thereto. Although the disclosure is described in detail with reference to the above-mentioned embodiments, those skilled in the art should understand that the technical solutions described in the above-mentioned embodiments may still be modified, and some or all of the technical features may be replaced equivalently; such modifications or replacements do not depart from the scope of the technical solutions described by the embodiments of the disclosure.

What is claimed is:

1. An electronic device having a general region and a functional region, wherein the general region comprises a first sub-region, and the functional region comprises a second sub-region, and the electronic device comprising:

a black matrix layer, wherein a first part of the black matrix layer is disposed above the first sub-region, and a second part of the black matrix layer is disposed above the second sub-region;

a plurality of first signal lines extending along a first direction; and a plurality of second signal lines extending along a second direction different from the first direction, wherein an area of the first sub-region is defined by two adjacent ones of the plurality of first signal lines and two adjacent ones of the plurality of second signal lines, an area of the second sub-region is defined by another two adjacent ones of the plurality of first signal lines and another two adjacent ones of the plurality of second signal lines, and the area of the second sub-region is greater than the area of the first sub-region.

2. The electronic device according to claim 1, further comprising:

an outer lead bonding region.

3. The electronic device according to claim 2, wherein the outer lead bonding region is provided with a flexible printed circuit or a chip on film.

4. The electronic device according to claim 1, further comprising:

a sensing unit, disposed under the functional region.

5. The electronic device according to claim 1, wherein a storage capacitance of the first sub-region is different from a storage capacitance of the second sub-region.

6. The electronic device according to claim 1, wherein the black matrix layer comprises a first aperture and a second aperture, wherein the first aperture corresponds to the general region, the second aperture corresponds to the functional region, and an area of the second aperture is greater than an area of the first aperture.

7. The electronic device according to claim 1, wherein a resolution of the general region is higher than a resolution of the functional region.

* * * * *